United States Patent [19]

Tsuchiya et al.

[11] Patent Number: 5,193,820
[45] Date of Patent: Mar. 16, 1993

[54] THREE-PIECE TYPE OIL RING ASSEMBLY

[75] Inventors: Takeji Tsuchiya; Yukio Tateishi; Akira Takahashi; Katsushi Ishihara, all of Yono, Japan

[73] Assignee: Nippon Piston Ring Co., Ltd., Tokyo, Japan

[21] Appl. No.: 724,767

[22] Filed: Jul. 2, 1991

[30] Foreign Application Priority Data

Jul. 20, 1990 [JP] Japan .................. 2-190604

[51] Int. Cl.$^5$ .............................................. F16J 9/06
[52] U.S. Cl. .................... 277/139; 277/141; 277/216; 267/1.5
[58] Field of Search ............... 277/159, 192, 193, 195, 277/196, 197, 198, 199, 216, 171, 172, 176, 138, 139, 140, 141, 148; 267/1.5

[56] References Cited

U.S. PATENT DOCUMENTS

| | | | |
|---|---|---|---|
| 2,970,022 | 1/1961 | Anderson | 277/139 |
| 3,481,611 | 12/1969 | Stratton | 277/141 |
| 3,606,355 | 9/1971 | Minegishi | 277/140 |
| 3,663,030 | 5/1972 | Miyamoto | 267/1.5 X |
| 3,738,668 | 6/1973 | Minegishi | 277/141 |
| 3,768,818 | 10/1973 | Minegishi | 277/139 X |
| 4,429,885 | 2/1984 | Chiba et al. | 277/216 X |
| 4,762,329 | 8/1988 | Kooroki | 277/216 X |
| 5,052,698 | 10/1991 | Kimura | 277/216 X |

FOREIGN PATENT DOCUMENTS

| | | | |
|---|---|---|---|
| 0778660 | 2/1968 | Canada | 277/141 |
| 0889199 | 12/1971 | Canada | 277/139 |
| 47-19653 | 6/1972 | Japan | |

Primary Examiner—William A. Cuchlinski, Jr.
Assistant Examiner—James K. Folker
Attorney, Agent, or Firm—Birch, Stewart, Kolasch & Birch

[57] ABSTRACT

A three-piece type oil ring assembly adapted to be fitted in an oil ring groove of a piston disposed within a cylinder comprises a spacer expander in the form of a gapped annulus made of section steel having substantially H-shaped radial cross section, and a pair of upper and lower side rails, each in the form of a gapped flat annulus. The spacer expander includes an axially protruding outer portion disposed on the outer circumference thereof and facing the inner surface of the cylinder, an axially protruding inner portion disposed on the inner circumference thereof and facing the innermost wall of the oil ring groove, and an axially flat connecting portion extending between the outer and inner protruding portions. The outer protruding portion has side rail supporting surfaces formed on the upper and lower ends thereof so as to be inclined toward the axially symmetrical centerline thereof along the radial direction at an acute angle with the radial direction. The inner protruding portion has upper and lower side rail pressing surfaces formed so as to be inclined outwardly along the direction from the upper and lower end of the inner protruding portion toward the intersection thereof with the connecting portion at an acute angle with the axial direction. Alternatively, the upper and lower side rail supporting surfaces are not inclined but extending radially for a length of 20% or less of the entire radial length of the spacer expander.

9 Claims, 2 Drawing Sheets

THREE-PIECE TYPE OIL RING ASSEMBLY

BACKGROUND OF THE INVENTION

1. Field of the Invention

The present invention relates to an oil ring assembly adapted to be used in a piston of an internal combustion engine and, more particularly, to improvements in a three-piece type oil ring adapted to be fitted in an axially narrow oil ring groove formed on the circumference of a piston disposed inside a cylinder of an internal combustion engine.

2. Description of the Prior Art

Recently, because of a growing tendency of internal combustion engines toward higher revolutions, higher outputs and less fuel consumption, shorter pistons and narrower piston rings including oil rings are being required. A three-piece type narrow oil ring assembly is disclosed in Japanese Examined Patent Publication JP-B- 4719653, as a solution to such requirements.

The prior art oil ring assembly disclosed above comprises a spacer expander in the form of a gapped annulus made of section steel having substantially H-shaped cross section, and a pair of upper and lower side rails, each in the form of a gapped flat annulus. The space expander includes an axially protruding outer portion disposed on the outer circumference thereof and facing the inner surface of the cylinder, an axially protruding inner portion disposed on the inner circumference thereof and facing the innermost wall of the oil ring groove, and an axially flat connecting portion extending between the outer and inner protruding portions. The space expander further has a plurality of radial slits formed therein so as to be alternately extending inwardly from the outer circumference, and outwardly from the inner circumference of the spacer expander. The overall axial width of the oil ring was 3 mm or less.

The prior art oil ring assembly, however, has a disadvantage in that, since the side rail supporting upper and lower end surfaces of the outer protruding portion of the spacer expander are extending radially, the upper and lower side rails tend to have adverse rocking motion around either the outer or inner circumferential edge of the upper and lower side rail supporting surfaces with the axially or vertically reciprocating movement of the piston at higher engine revolutions, thereby resulting in a poor side rail attitude stability.

The prior art oil ring assembly also has another disadvantage in that, since the outer circumferential axial surface of the inner protruding portion of the spacer expander is formed parallel to the axial direction, the upper and lower side rails are pressed onto the inner surface of the cylinder by the side rail pressing surface only in the direction perpendicular to the inner surface of the cylinder, the side rails do not come into close contact with the upper and lower end walls of the oil ring groove, thereby resulting in a poor sealing performance.

SUMMARY OF THE INVENTION

It is, therefore, an object of the present invention to provide an improved three-piece type oil ring assembly comprising a spacer expander in the form of a gapped annulus made of section steel having substantially H-shaped radial cross section, and a pair of upper and lower side rails, the spacer expander having a plurality of radial slits formed therein, alternately extending inwardly from the outer circumference and outwardly from the inner circumference of the spacer expander. The oil ring assembly yields excellent sealing performance and side rail attitude is stable over a wide range of engine revolutions from low to high.

According to the present invention, there is provided a first improved three-piece type oil ring assembly comprising a spacer expander in the form of a gapped annulus made of section steel having substantially H-shaped radial cross section, and a pair of upper and lower side rails, each in the form of a gapped flat annulus. The spacer expander includes an axially protruding outer portion disposed on the outer circumference thereof and facing the inner surface of the cylinder, an axially protruding inner portion disposed on the inner circumference thereof and facing the innermost wall of the oil ring groove, and an axially flat connecting portion extending between the outer and inner protruding portions. The first oil ring assembly is characterized in that the outer protruding portion of the spacer expander has side rail supporting surfaces formed on the upper and lower end of the outer protruding portion, each inclined toward the axially symmetrical centerline thereof along the direction from the outer circumference toward the inner circumference thereof at an acute angle with the radial direction, the inner portion of the spacer expander further having upper and lower side rail pressing surfaces formed on the outer circumferential surface of the inner protruding portion so as to be inclined outwardly along the axial direction from the upper and lower end of the inner protruding portion toward the intersection thereof with the connecting portion at an acute angle with the axial direction.

Furthermore, according to the present invention, there is provided a second improved three-piece type oil ring assembly similar to the first oil ring assembly described above, except that the second oil ring assembly is further characterized in that the outer protruding portion of the spacer expander has upper and lower side rail supporting surfaces respectively formed so as to be radially extending for a length of 20% or less of the entire radial length of the spacer expander.

The space expander, according to the present invention, comes into contact with the side rails both at the side rail supporting surfaces and at the side rail pressing surfaces. Each of the side rails is loaded both at the outer circumferential end of the side rail with frictional force resulting from the sliding movement thereof against the inner surface of the cylinder, and at the inner circumferential end of the side rail with pressing force from the spacer expander. The frictional and pressing forces respectively generate moment around the contact point between the side rail and the side rail supporting surface.

In case of the first oil ring assembly according to the present invention, in which the side rail supporting surface is inclined, the contact point is always located at the outer circumferential edge of the side rail supporting surface of the spacer expander near the inner surface of the cylinder. Since the distance between this contact point and the inner surface of the cylinder is shorter than the distance between this contact point and the inner circumferential end of the side rail, the moment of the pressing force from the spacer expander is greater than the moment of the frictional force. Therefore, the side rails are not affected by the moment from the frictional force, and the side rail attitude is well stabilized.

However, in case of the inclined angle of the side rail supporting surface being less than 1 degree, the contact point between the side rail and the side rail supporting surface moves to the inner circumferential edge of the side rail supporting surface when the inner circumferential end of the side rail moves down along the side rail pressing surface to the innermost or bottom position thereof, and subsequently the outer circumferential end of the side rail moves upwards away from the outer circumferential edge of the side rail supporting surface. Consequently, the moment of the pressing force from the spacer expander becomes smaller, and the side rail attitude is easily affected by the frictional force at the outer circumferential end of the side rail, resulting in a poor stability.

On the other hand, in case of the inclined angle of the side rail supporting surface being over 15 degrees, the outer circumferential edge of the side rail supporting surface tends to be easily worn. When worn, it causes an unstable side rail attitude.

In case of the second oil ring assembly according to the present invention, in which the upper and lower side rail supporting surface is not inclined but extending radially for a length of 20% or less, for example 0.2 to 0.4 mm, of the entire radial length of the spacer expander, even when the inner circumferential end of the side rail moves down along the side rail pressing surface to the innermost or bottom position thereof, and the contact point between the side rail and the side rail supporting surface moves to the inner circumferential edge of the side rail supporting surface, the moment of the pressing force from the spacer expander still can be arranged to be amply greater than the moment of the frictional force, since the distance between the new contact point of the inner circumferential edge of the side rail supporting surface and the inner surface of the cylinder is slightly incremented compared to the previous distance between the outer circumferential edge of the side rail supporting surface and the inner surface of the cylinder, but still shorter than the distance between this contact point and the inner circumferential end of the side rail, thus resulting in a stabilized side rail attitude.

However, in case of the radial length of the upper and lower side rail supporting surface being more than 20% of the entire radial length of the spacer expander, the distance between the contact point of the inner circumferential edge of the side rail supporting surface and the inner surface of the cylinder becomes greater, thus resulting in a poor side rail attitude stability.

According to the present invention, since the side rail pressing surfaces are inclined, the upper and lower side rails are respectively pressed onto the upper and lower end walls of the oil ring grooves to come into a close contact therewith, thus yielding an excellent sealing performance.

As described above, the prior art three-piece type oil ring assembly which comprises a spacer expander and a pair of upper and lower side rails holding the spacer expander in therebetween, in which the spacer expander is in the form of a gapped annulus made of section steel having substantially H-shaped radial cross section and has a plurality of radial slits formed therein so as to alternately extend inwardly from the outer circumference of said outer protruding portion and outwardly from the inner circumference of said inner protruding portion, and the pair of upper and lower side rails are in the form of a gapped flat annulus. This prior art oil ring assembly is improved a firstly by having the side rail supporting surfaces formed so as to restrain moments adversely affecting the side rail attitude stability, and secondly by having the side rail pressing surfaces formed so that the upper and lower side rails are respectively brought into a close contact with the upper and lower end walls of the oil ring groove.

Therefore, according to the present invention, an advantage is obtained in that better side rail attitude stability and sealing performance are accomplished at engine revolutions in a wide range from low to high.

Subsequently, a remarkable effect is also obtained in that the oil consumption of the internal combustion engine is reduced by using the oil ring assembly of the present invention.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DESCRIPTION OF THE PREFERRED EMBODIMENTS

Figure 1:
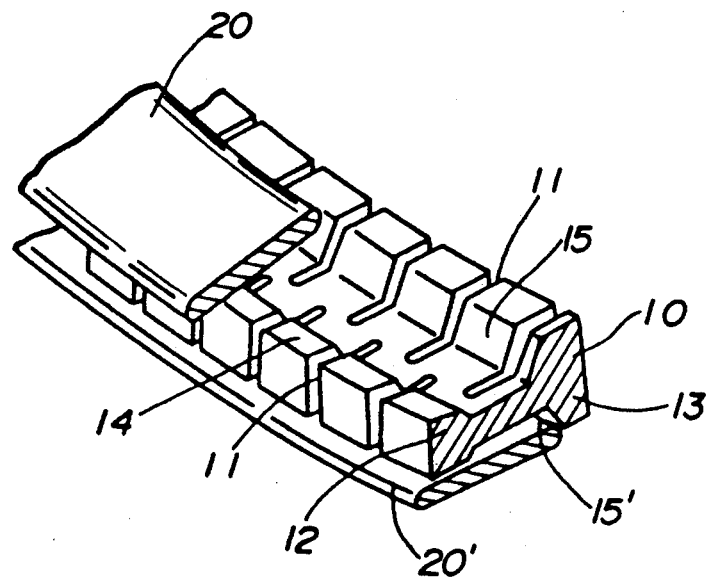
FIG. 1 is a fragmentary perspective view of an oil ring assembly in accordance with a first embodiment of the present invention.
Figure 2:
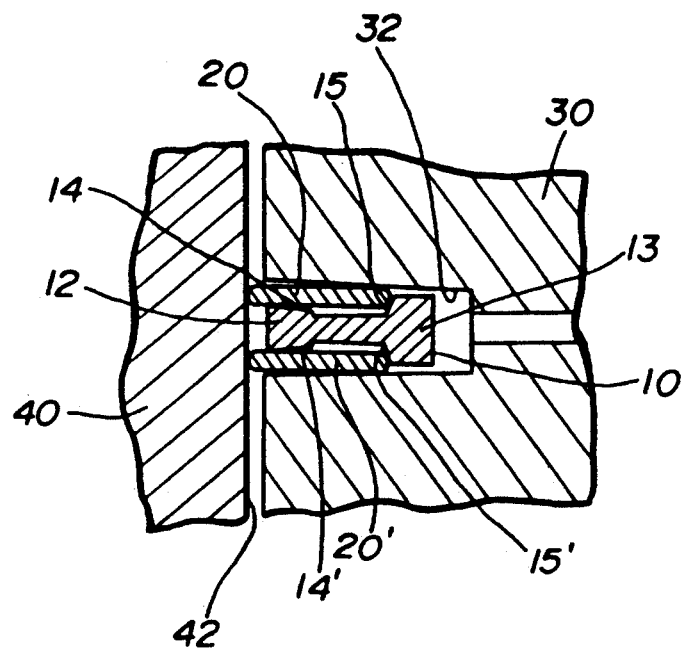
FIG. 2 is an axial cross sectional view of the oil ring assembly of FIG. 1 fitted in an internal combustion engine.
Figure 3:
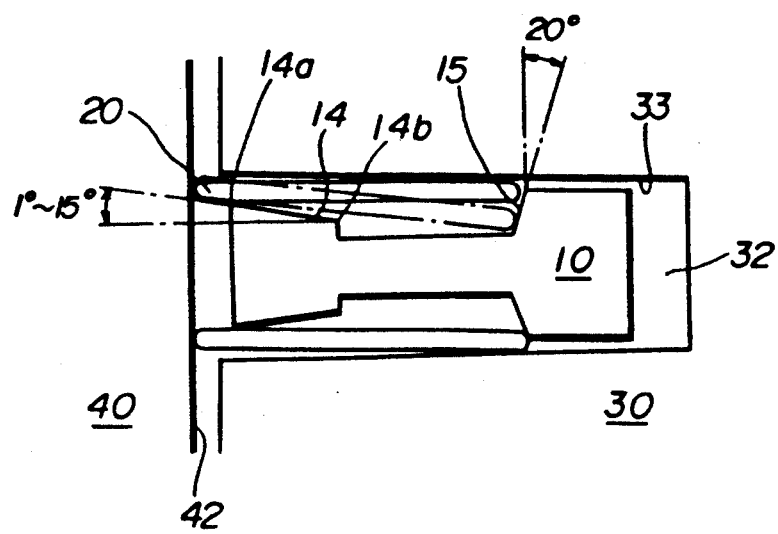
FIG. 3 is an enlarged schematic cross sectional view of the oil ring assembly of FIG. 1 illustrating the relationship between the spacer expander, the upper and lower side rails, the oil ring groove of the piston, and the inner surface of the cylinder.

FIGS. 1 to 3 illustrate a three piece type oil ring assembly in accordance with a first embodiment of the present invention. As shown in FIG. 1, the oil ring assembly of the first embodiment comprises a spacer expander 10 in the form of a gapped annulus made of section steel having substantially H-shaped radial cross section, and a pair of upper and lower side rails 20, 20', each in the form of a gapped flat annulus. The spacer expander 10 has a plurality of radial slits 11 formed therein so as to be alternately extending inwardly from the outer circumference and outwardly from the inner circumference of said spacer expander 10.

As shown in FIGS. 1 and 2, the oil ring assembly is fitted into the oil ring groove 32 of a piston 30, then inserted into a cylinder 40 of an internal combustion engine (not shown).

The spacer expander 10 has an axially protruding outer portion 12 disposed on the outer circumference thereof and facing the inner surface 42 of the cylinder 40, an axially protruding inner portion 13 disposed on the inner circumference thereof and facing the innermost wall of the oil ring groove 32, and an axially flat connecting portion extending between the outer and inner protruding portions 12, 13. The outer and inner protruding portions 12, 13 and the connecting portion are axially symmetrically aligned. The outer protruding portion 12 is axially wider than the flat portion, and the inner protruding portion 13 is axially wider than the outer protruding portion 12.

The outer protruding portion 12 has an upper side rail supporting surface 14 and a lower side rail supporting surface 14' respectively disposed on the upper end surface and the lower end surface of the outer protruding portion 12. The inner protruding portion 13 has an upper side rail pressing surface 15 and a lower side rail pressing surface 15' respectively disposed on the upper and lower halves of the outer circumferential surface of the inner protruding portion 13. The upper and lower side rail supporting surfaces 14, 14' respectively support the upper and lower side rails 20, 20' axially. The upper and lower side rail pressing surfaces 15, 15' respectively press the upper and lower side rails 20, 20' onto the inner surface 42 of the cylinder 40.

As shown enlarged in FIG. 3, the upper and lower side rail pressing surfaces 15, 15' are formed so as to be respectively inclined outwardly along the axial direction from the upper and lower end thereof toward said connecting portion at an acute angle with the axial direction. The acute angle between the inclined surfaces 15, 15' and the axial direction may be set at an angle in a range of 15 to 25 degrees, for example around 20 degrees.

The upper and lower side rail supporting surfaces 14, 14' are formed so as to be respectively inclined toward the axially symmetrical center of the spacer expander 10 along the radial direction from the outer circumference toward the inner circumference of the outer portion 12 at an acute angle with the radial direction. The acute angle between the inclined surfaces 14, 14' and the radial direction may be set at an angle in a range of 1 to 15 degrees.

For the convenience of description, but not limiting the present invention, the upper half of the force and moment mechanism including the spacer expander 10, the upper and lower side rails 14, 14', the oil ring grooves 32, and the inner surface 42 of the cylinder 40 will be discussed below.

When the spacer expander 10 expands radially outwardly, the upper side rail pressing surface 15 presses the inner circumferential end of the upper side rail 20. The pressing force which is perpendicular to the inclined upper side rail pressing surface 15 is resolved into an axial component force and a radial component force, whereby the axial component force presses the upper side rail 20 onto the upper end wall 33 of the oil ring groove 30 for a close contact therebetween.

Since the upper side rail supporting surface 14, in accordance with the first embodiment of the present invention, is inclined, the contact point between the upper side rail 20 and the upper side rail supporting surface 14 is always on the outer circumferential edge 14a thereof. A frictional force acts on the outer circumferential end of the upper side rail 20 that is generated by the sliding movement of the outer circumferential end of the upper side rail 20 against the inner surface 42 of the cylinder 40. A pressing force, acting on the inner circumferential end of the upper side rail 20, is generated by the outward expansion of the spacer expander 10. Those frictional and pressing forces generate moments with respect to the contact point on the outer circumferential edge 14a. Since the distance between the contact point of the outer circumferential edge 14a and the upper side rail pressing surface 15 is greater than the distance between the contact point of the outer circumferential edge 14a and the inner surface 42 of the cylinder 40, the moment of the pressing force is dominant, thus the upper side rail attitude hardly tends to be affected by the frictional force.

In case the inner circumferential end of the side rail 20 moves down along the side rail pressing surface 15 to the innermost or bottom position thereof, and the upper side rail 20 comes into contact with the upper end wall 33 of the oil ring groove 32 at a contact point near the upper opening edge of the oil ring groove 32, as shown in phantom lines in FIG. 3, the moments of the frictional and pressing forces are generated with respect to the contact point. However, since the distance between the contact point and the inner surface 42 of the cylinder 40 is shorter than the distance between the outer circumferential edge 14a of the upper side rail supporting surface 14 and the inner surface 42 of the cylinder 40, the moment of the pressing force is greater than the moment of the frictional force, thus the upper side rail attitude remains stable without being adversely affected by the moment of the frictional force.

Figure 4:
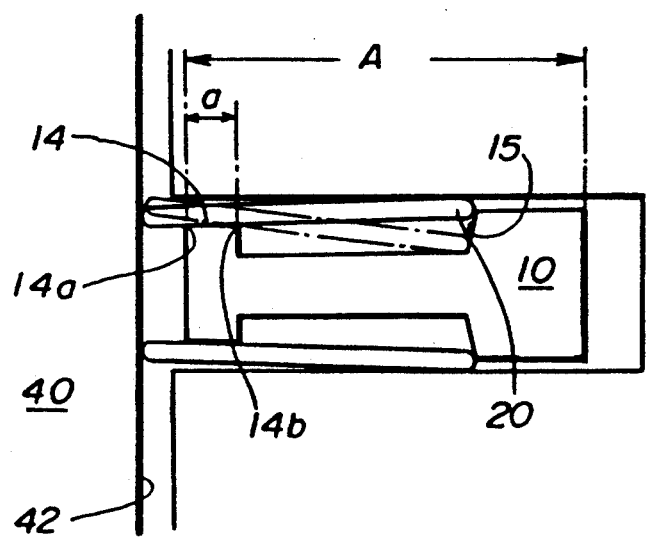
FIG. 4 is an enlarged schematic cross sectional view of the oil ring assembly in accordance with a second embodiment of the present invention illustrating the relationship similar to FIG. 3.

Similar effect can be produced by a three-piece oil ring assembly in accordance with a second embodiment of the present invention, as shown in FIG. 4, which is similar to the first embodiment shown in FIGS. 1 to 3 except that the outer protruding portion 12 has the upper and lower side rail supporting surfaces 14 formed so as to be horizontally or radially extending instead of being inclined away from the radial direction as in the first embodiment. The radial length "a" of the upper and lower side rail supporting surfaces 14, 14' is given as 20% or less, for example 0.2 to 0.4 mm, of the entire radial length "A" of the spacer expander 10.

In case the inner circumferential end of the upperside rail 20 moves down along the side rail pressing surface 15 to the innermost or bottom position thereof toward the connecting portion, the contact point between the upper side rail 14 and the upper side rail supporting surface 14 moves from the outer circumferential edge 14a to the inner circumferential edge 14b, as shown in phantom lines in FIG. 4. However, since the radial length of the upper side rail supporting surface 14 is very small, or in other words, the distance between the contact point and the inner surface 42 of the cylinder 40 is incremented very little by the movement of the contact point from the outer circumferential edge 14a to the inner circumferential edge 14b of the outer protruding portion 12, the moment of the pressing force still remains greater than the moment of the frictional force, thus the upper side rail attitude remains unchanged and stable. e

What is claimed is:

1. A three-piece type oil ring assembly adapted to be fitted in an oil ring groove of a piston disposed within a cylinder comprising:

a spacer expander in the form of a gapped annulus made of section steel having substantially H-shaped radial cross section, and a pair of upper and lower side rails, each in the form of a gapped flat annulus, said spacer expander being adapted to be substantially held in between said upper and lower side rails, said spacer expander comprising an axially protruding outer portion disposed on an outer circumference thereof and facing an inner surface of said cylinder, an axially protruding inner portion disposed on an inner circumference thereof and facing an innermost wall of said oil ring groove, and an axially flat connecting portion extending between said outer and inner protruding portions, said outer and inner protruding portions and said connecting portion being axially symmetrically aligned, said outer protruding portion being axially wider than said flat portion, said inner protruding portion being axially wider than said outer protruding portion, said outer protruding portion having an upper side rail supporting surface and a lower side rail supporting surface respectively disposed on an upper end surface and a lower end surface thereof, said inner protruding portion having an upper side rail pressing surface and a lower side rail pressing surface respectively disposed on upper and lower halves of an outer circumferential surface thereof, said spacer expander having a plurality of radial slits formed therein so as to be alternately extending inwardly from an outer circumference toward an inner circumference and outwardly from said inner circumference toward said outer circumference of said spacer expander, and said outer protruding portion further having said side rail supporting surfaces formed so as to be respectively inclined toward the axially symmetrical centerline of the spacer expander along the radial direction from the outer circumference toward the inner circumference thereof at an acute angle with the radial direction, said inner protruding portion having said upper and lower side rail pressing surfaces formed respectively inclined outwardly along an axial direction from upper and lower ends thereof toward an intersection thereof with said connecting portion at an acute angle with the axial direction.

2. The oil ring assembly of claim 1, wherein said acute angle of incline of the side rail supporting surfaces is in a range of 1 to 15 degrees.

3. The oil ring assembly of claim 1, wherein said acute angle of incline of the side rail pressing surfaces is in a range of 15 to 25 degrees.

4. The oil ring assembly of claim 1, wherein said side rail supporting surfaces are respectively formed so as to be radially extending for a length of 20% or less of an entire radial length of said spacer expander.

5. The oil ring assembly of claim 4, wherein said acute angle of incline of the side rail pressing surfaces is in a range of 15 to 25 degrees.

6. A three-piece type oil ring assembly adapted to be fitted in an oil ring groove of a piston disposed within a cylinder comprising:

a spacer expander in the form of a gapped annulus made of section steel having a substantially H-shaped radial cross section, and a pair of upper and lower side rails, each in the form of a gapped flat annulus, said spacer expander being adapted to be substantially held in between said upper and lower side rails, said spacer expander comprising an axially protruding outer portion disposed on an outer circumference thereof and facing an inner surface of said cylinder, an axially protruding inner portion disposed on an inner circumference thereof and facing an innermost wall of said oil ring groove, and an axially flat connecting portion extending between said outer and inner protruding portions, said outer and inner protruding portions and said connecting portion being axially symmetrically aligned, said outer protruding portion being axially wider than said flat portion, said inner protruding portion being axially wider than said outer protruding portion, said outer protruding portion having an upper side rail supporting surface and a lower side rail supporting surface respectively disposed on an upper end surface and a lower end surface thereof, said inner protruding portion having an upper side rail pressing surface and a lower side rail pressing surface respectively disposed on upper and lower halves of an outer circumferential surface thereof, said side rail supporting surfaces being respectively formed so as to be radially extending for a length of 20% or less of an entire radial length of said spacer expander, said spacer expander having a plurality of radial slits formed therein so as to be alternately extending inwardly from an outer circumference toward an inner circumference and outwardly from said inner circumference toward said outer circumference of said spacer expander, and said inner protruding portion having said upper and lower side rail pressing surfaces formed respectively inclined outwardly along an axial direction from upper and lower ends thereof toward an intersection thereof with said connecting portion at an acute angle with the axial direction.

7. The three-piece type oil ring assembly of claim 6, wherein said acute angle of incline of the side rail pressing surfaces is in a range of 15 to 25 degrees.

8. The three-piece type oil ring assembly of claim 6, wherein said outer protruding portion having said side rail supporting surfaces is formed so as to be respectively inclined toward an axially symmetrical centerline of said spacer expander along a radial direction from said outer circumference toward said inner circumference thereof at an acute angle with the radial direction.

9. The three-piece type oil ring assembly of claim 8, wherein said acute angle of incline of the side rail supporting surfaces is in a range of 1 to 15 degrees.

* * * * *